April 21, 1970   F. CRISTIANO, JR., ET AL   3,507,754
RECIRCULATING MULTISTAGE FLASH EVAPORATION SYSTEM AND METHOD
Filed Dec. 21, 1966
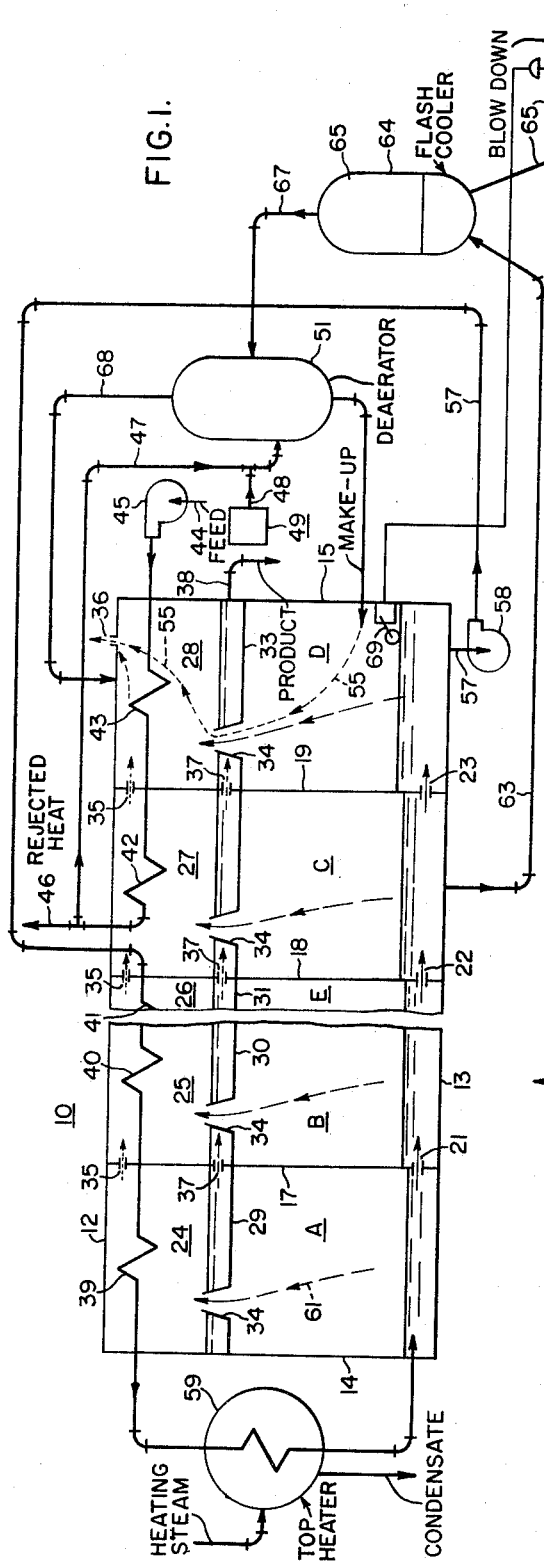
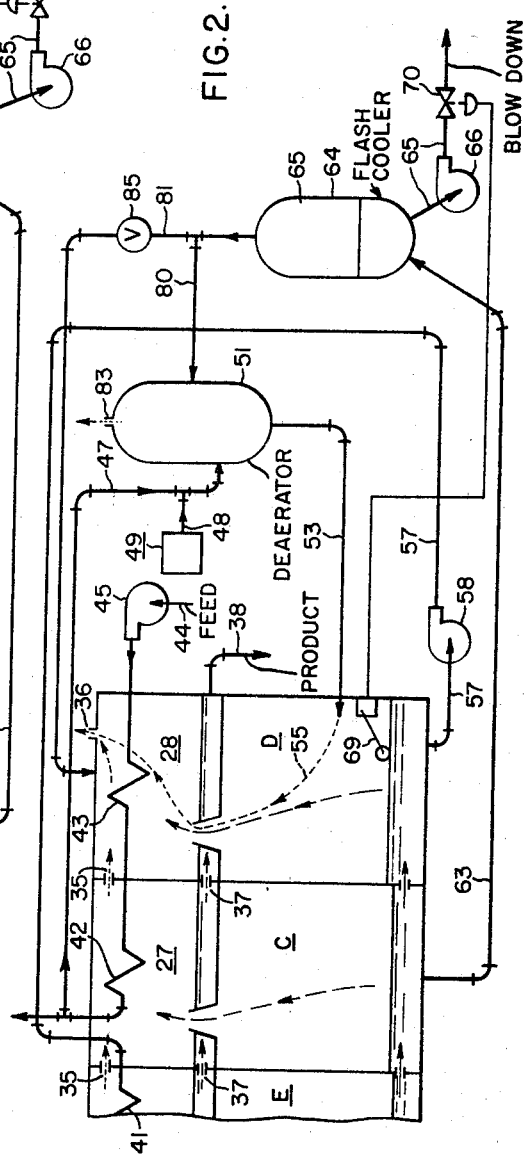
INVENTORS
Frank Cristiano, Jr.
and Roland L. Coit United States Patent Office
3,507,754
Patented Apr. 21, 1970

3,507,754
RECIRCULATING MULTISTAGE FLASH EVAPORATION SYSTEM AND METHOD
Frank Cristiano, Jr., Monroeville, and Roland L. Coit, Swarthmore, Pa., assignors to Westinghouse Electric Corporation, Pittsburgh, Pa., a corporation of Pennsylvania
Filed Dec. 21, 1966, Ser. No. 603,528
Int. Cl. B01d 3/06
U.S. Cl. 203—7                                  9 Claims

ABSTRACT OF THE DISCLOSURE

This invention relates to a recirculating multistage flash evaporator for converting sea water into potable water, wherein the make-up sea water is initially treated with chemical additives to minimize scaling and corrosion, and provides an arrangement wherein the treated make-up water is added to the system at the last and lowest pressure evaporation stage for deaeration, but the enriched brine resulting from staged evaporation is partially removed from a higher pressure stage, stripped of its vapor and then directed to waste, while the brine reaching the last stage together with the deaerated make-up (as a mixture) are recirculated through the entire flash evaporator to utilize the chemical additives to the utmost.

This invention relates to multistage flash evaporators for converting saline or otherwise impure water into pure or at least potable water, and has for an object to provide improved apparatus of this type and method of operating.

Multistage flash evaporators for converting impure water, such as sea water or brackish water are coming into extensive use for converting large quantities of water, on the order of millions of gallons per day. Evaporators of this type employ many stages and 30 to 50 (or more) stages are now becoming common. Such multistage evaporators must process enormous quantities of impure make-up water, since only about 30–50% of the impure water processed is converted into product water. Hence, to provide product water at the rate of about 3,000,000 gallons per day (for example) about 6,000,000 to 9,000,000 gallons of impure make-up water must be processed by the evaporator.

In view of the above, the operational efficiency of such evaporation plants is extremely important and a constant and ever increasing need exists for improvements that reduce the cost of operation of such plants. This need is particularly acute in environments where a severe shortage of fresh water exists, but where the economic factors involved, at present, prohibit the use of such plants.

Present multistage flash evaporation systems employ pre-treatment of the incoming sea water with suitable chemicals for inhibiting the formation of hard scale and corrosion, while permitting operation of the system at higher temperatures than heretofore, with attendant increasing in thermal efficiency and reduction in the cost of producing potable water.

In most systems employing chemical pre-treatment of the make-up water, only a portion of the enriched brine resulting from staged evaporation is withdrawn or "blown down" from the system and the remainder is recirculated through the system as a mixture with the newly admitted and pre-treated make-up in a regenerative heat exchange circuit, thereby utilizing as much as possible the heat energy and the chemical additives put into the system.

In a present highly successful system of the above type, incoming sea water is first treated with acid, then deaerated in a vessel to remove non-condensible gases, such as air, carbon dioxide, and the like, and subsequently injected into the last and lowest flash evaporation chamber as make-up water. The enriched brine reaching the last flash chamber is thus mixed with the treated make-up and, in the subsequent blow-down, a mixture of brine and treated make-up is unavoidably ejected from the system. Although this scheme provides highly desirable further deaeration of the make-up in the large available space of the last chamber, some of the treated make-up is lost from the system before it can be utilized. This loss is a factor in the cost of operation of this system that is evidenced by the rate of consumption of the chemical additive.

Other systems mix the make-up water with the brine after it is withdrawn from the last flash chamber for recirculation. Such systems preserve the treated make-up but fail to take advantage of the capability of the last flash chamber for deaerating the make-up.

It is a primary object of this invention to provide a multistage flash evaporation system and method in which the last and lowest pressure flash chamber is employed to effect deaeration of chemicaly treated make-up water but in which the treated make-up is fully utilized before removal from the system.

A more specific object is to provide a flash evaporation system of the above type in which all of the enriched brine reaching the last and lowest pressure flash chamber is mixed with the treated make-up within the chamber and removed jointly therefrom for recirculation in the system.

A still more specific object is to provide an improved system of the above type in which all of the treated make-up after deaeration in the last flash chamber undergoes subsequent complete flash evaporation before removal from the system as enriched brine in the "blow-down."

Yet another object is to provide an improved system of the above type in which all of the treated make-up undergoes complete flash evaporation before removal from the system and in which the enriched brine is substantially stripped of all of its vapor before blow-down from the system.

In accordance with the invention, the incoming sea water for make-up is treated with suitable chemical additives, then directed to a deaerating vessel for initial deaeration of its non-condensible gases, and subsequently admitted to the last and lowest pressure flash chamber to obtain further deaeration. However, the enriched brine for blow-down is withdrawn from a preceding (preferably the next to the lowest pressure) flash chamber. The remaining brine that reaches the last flash chamber is mixed therein with the deaerated and treated make-up and then the entire mixture is recirculated through the system.

The brine withdrawn from the above-mentioned preceding flash chamber is then directed to a flash cooler vessel maintained at substantially the same pressure as the last flash evaporation stage, where additional flash evaporation is attained to strip the brine of its remaining vapor. The thus stripped and cooled brine is then blown down from the system and the vapor captured therefrom may be condensed to augment the yield of potable water.

If desired, a portion of the vapor attained from the flash cooling of the brine before blow-down may be employed to augment the liberation of non-condensible gases from the treated make-up in the deaeration vessel.

The above and the objects are effected by the invention as will be apparent from the following description and claims taken in connection with the accompanying drawing, forming a part of this application, in which:

FIGURE 1 is a diagrammatic view of a multistage flash evaporation system incorporating the invention; and FIG. 2 is a diagrammatic view of a portion of a multistage flash evaporation system illustrating a second embodiment of the invention.

Referring to the drawing in detail, in FIG. 1 there is shown a multistage flash evaporation system of the recirculating and regenerative heat exchange type, generally designated 10. Although the system may be employed to evaporate any suitable liquid solution to separate the solvent from the solute, it is primarily and especially suited for recovering pure or at least potable water from impure water such as brackish or sea water.

The system employs a plurality of staged flash evaporation chambers A, B, C and D, wherein chamber A is the first and highest pressure stage, B is the next to highest, chamber C is the next to the lowest pressure stage, and chamber D is the last and lowest pressure stage. Any desired number of intervening stages may be employed, hence a portion of the system has been broken away between stages B and C at an intervening stage E (partially shown).

As well known in the art, the evaporation chambers may be formed by metal housing structure of generally parallel-opiped shape comprising a top wall 12, a bottom wall 13, vertical end walls 14 and 15, as well as front and rear walls (not shown), and vertical internal partitions 17, 18 and 19 which cooperate with the outer wall structure to form the chambers. The chambers A, B, E, C and D are disposed in liquid communication with each other by interconnecting slots or orifices 21, 22 and 23 formed in the partitions 17, 18 and 19, respectively, adjacent the bottom wall 13, so that the water undergoing flash evaporation flows from chamber-to-chamber successively from chamber A to chamber D through the orifices 21, 22 and 23 with attendant reduction in temperature and pressure and progressive increase in mineral concentration to form an enriched brine.

A plurality of vapor condensing spaces 24, 25, 26, 27 and 28 are also defined by the housing structure for receiving the condensible vapors formed in the associated chambers A, B, E, C and D. The condensing spaces are disposed in the upper portion of the housing structure and are further defined by generally horizontally extending trays 29, 30, 31, 32 and 33. Each of the trays is further provided with a vapor flow passage 34, so that the vapors formed in the associated chambers may flow upwardly therethrough into the condensing spaces.

Each of the partitions 17, 18 and 19 is provided in its uppermost portion with an aperture 35 and the last condensing space 28 is vented to a suitable air ejector (not shown) by an outlet 36, so that, in a manner well known in the art, air and other incondensible gases are continuously removed from each of the stages in the system in a manner to maintain the last stage D at the lowest pressure and the preceding stages C, E, B and A at successively higher pressures.

Each of the partitions 17, 18 and 19 is further provided with an aperture 37 immediately above the associated trays, so that the falling condensate is collected in the trays and is free to flow through the apertures 37 to the right (as indicated by the arrows) to the tray 33 associated with the last stage D for collection and removal therefrom, as indicated by the line 38, as product water.

The condensing spaces 24 to 26 are provided with suitable surface heat exchanging or condensing tube structures 39, 40 and 41, for regeneratively heating the circulating impure liquid by the heat extracted in condensing the vapors, while the condensing spaces 27 and 28 are provided with heat exchanging or condensing tube structures 42 and 43 for rejecting a portion of the heat from the system.

Impure water feed, such as sea water or brackish water from any suitable source, as indicated by the line 44, is pressurized by a suitable pump 45 and directed through the heat exchange tube structure 43 and 42, and then a portion of the thus heated water is removed from the system as indicated by the line 46, to accommodate the heat rejection requirements of the system. The remaining portion, as indicated by the line 47 is mixed with any suitable scale and/or corrosion inhibiting chemical additive, for example sulphuric acid, as indicated by the line 48, at a metered rate, from a suitable supply 49, and then directed to a deaeration structure, for example a vessel 51 disposed externally of the lowest pressure chamber D. After deaeration in the vessel 51, the thus treated and deaerated impure water, usually termed "make-up" water, is introduced into the chamber D, as indicated by the line 53, wherein it is subjected to further deaeration as indicated by the dotted arrows 55, and the thus treated and deaerated make-up liquid falls to the bottom of the chamber D where it mixes with the enriched brine.

The mixture of brine and make-up water is removed from the last and lowest pressure chamber D by way of a conduit 57 having a pump 58 interposed therein and directed successively through the heat exchange tube structure 41, 40 and 39 for regenerative heating, then to a suitable external heater 59, usually called a top heater, where it is heated to a predetermined temperature and then directed to the first and highest pressure stage A to initiate the flash evaporation sequence and complete the recirculation loop.

As the thus heated and pressurized water for evaporation is subjected to the reduced pressure ambient prevailing in the flash chamber A, a portion thereof is flashed into vapor, and the vapor thus formed is directed upwardly through the flow passage 34, as indicated by the dashed arrows 61, into the condensing space. The vapor is condensed by heat transfer to the heat exchange tube structure 39 and falls into the tray 29 for collection; and the water flowing through the tube structure is heated.

The remaining unflashed liquid flows through the orifice 21 into the succeeding and lower pressure chamber B, where the operation is repeated, and thence through the orifices 22 and 23 into the successively lower pressure chambers for further flash evaporation. As the water flows through the chambers with partial evaporation thereof, the water becomes increasingly enriched or concentrated with salts and minerals and is termed enriched brine, as previously stated.

A minor portion of the brine from a stage at a higher pressure than the last stage D but at a lower pressure than the first stage A, preferably from the next to last chamber C, is withdrawn therefrom by a conduit 63, and directed to a vessel 64 maintained at substantially the same reduced pressure ambient as the last chamber D (i.e. at a pressure lower than the ambient pressure in the chamber C). The brine reaching the vessel 64 (hereinafter termed a flash-cooler) is thus subjected to further flash evaporation and removal therefrom by a conduit 65 having a pump 66 interposed therein and is thence discarded or "blown-down" from the system to waste in a substantially thermally vitiated state.

The flash cooler 64 is provided with an upper vapor collection space 65 disposed in fluid communication with the deaeration vessel 51 by a conduit 67 and the upper portion of the deaeration vessel is disposed in fluid communication with the condensing space 28 in the last stage by a conduit 68. Hence, the vapor formed in the flash cooler 65 is directed to the deaeration vessel 51 where it initially augments the deaeration of the make-up water, and then together with the incondensible gases liberated from the make-up water is directed to the condensing space 28. The vapor in the mixture of vapor and non-condensible gases is thus condensed and falls into the tray 33 to augment the quantity of potable water produced, while the non-condensible gases are withdrawn from the system through the outlet 36 with the other non-condensible gases being removed from the stages.

The rate of withdrawal of the brine from the chamber C is preferably controlled by a suitable liquid level sensing device 69 responsive to the level of the liquid in the last chamber D and operable to control a regulating valve 70, disposed in the blow-down conduit 65. Accordingly, the desired liquid level in the last chamber D is maintained for proper operation of the recirculating pump 58 as well as the desired liquid level in the preceding chamber C and in the flash cooler 64 for proper operation of the blow-down pump 66.

Since the brine that must necessarily be discarded from the flash evaporation system is removed before it reaches the last stage D, and since the brine reaching the last stage D is recirculated through the system in its entirety is a mixture with a newly admitted make-up, none of the newly added make-up is lost from the system until it has been directed throughout the system and utilized to the utmost. Hence, the chemical additive is fully utilized, the deaeration capability of the last stage D is fully utilized, and, in addition, the discarded brine is stripped of its vapor to augment the potable water production, before being blown-down from the system.

In FIG. 2 there is illustrated another embodiment of the invention. This embodiment may be substantially similar to that shown in FIG. 1 and already described, hence, only that portion of the system that is modified has been shown and will be described, and those portions similar to those already described in the first embodiment are identified by the same numerals.

In this embodiment, a minor portion of the brine is removed from the next to last chamber C and directed to the flash cooler vessel 64 wherein it is stripped of its vapor, as in FIG. 1. However, the vapor collecting space 65 in the flash cooler is connected to the deaeration vessel by a conduit 80 and to the condensing space 28 in the last stage by a conduit 81 disposed in parallel therewith. Also, the deaeration vessel 51 is provided with a vent 83 in its upper portion connected to a suitable air ejector and maintained at a reduced pressure ambient substantially the same as that prevailing in the last evaporation chamber D.

The conduit 81 may be provided with a valve 85 for regulating the flow of vapor therethrough, or, if desired a suitable restricting orifice (not shown) may be employed in its stead.

Here again, the vapor admitted to the deaerator vessel 51 is employed to enhance the deaeration of the treated make-up water therein and the liberated non-condensible gases together with a small quantity of uncondensed vapor are ejected from the system through the vent 83. The remainder of the vapor is directed to the condensing space 28 for condensation and collection, as potable product water, as in the first embodiment.

With this arrangement, the flow of fluid from the flashcooler 64 to the condensing space 28 is substantially pure vapor, with a minimum of incondensible gases, and the incondensible gases liberated in the deaerator vessel 51 are ejected directly from the system thereby decreasing the load on the ejector (not shown) serving to evacuate the system through the vent 36.

It will now be seen that the invention provides a highly improved multi-stage flash evaporation system of the recirculating type that retains the advantages of other systems heretofore proposed without any of the disadvantages of such systems. That is, the treated make-up water is fully utilized until it reduced to an enriched brine before removal from the system, while the large volumetric space inherent in the last and lowest pressure flash chamber is advantageously employed to further deaerate the incoming treated and deaerated make-up water.

Although the invention has been shown in several forms, it will be obvious to those skilled in the art that it is not so limited, but is susceptible of various other changes and modifications without departing from the spirit thereof. For example, although the deaeration structure 51 has, for simplicity been illustrated as an external vessel connected to the lowest pressure chamber D by a line 53, it could, if desired be disposed within the chamber D.

We claim as our invention:

1. A recirculating multistage flash evaporation system for extracting substantially pure water from water containing impurities in solution, comprising a plurality of heat exchanging means having a tubed heat rejecting section, a tubed heat recovering section and a top heating means for adding heat to the system, means for passing impure water through the heat recovering section and top heating means of said heat exchanging means, thereby to heat the impure water to a predetermined temperature, means defining a plurality of chambers for flash evaporation of at least a portion of the thus heated impure water, thereby to form condensible vapors, said chambers being staged successively from a first and highest pressure stage disposed in fluid communication with said top heating means to a last and lowest pressure stage and being in successive liquid communication with each other, whereby, as the impure water flows from stage-to-stage with attendant partial evaporation, an enriched impure water solution is attained, means including a conduit for removing a portion of the enriched solution from a chamber at a higher pressure than said last chamber but at a lower pressure than said first chamber, means including a flash cooling vessel disposed in communication with said conduit for receiving said removal portion and partially flash evaporating said portion of enriched solution with attendant cooling of the enriched solution portion, means connecting said flash cooling vessel at its upper vapor space to a condensing region of lower pressure than said higher pressure chamber, means for directing the thus cooled enriched solution portion to waste, means for supplying impure make-up water, means for treating the impure make-up water with a chemical additive to reduce the corrosion and/or scaling tendencies of the make-up water, means for admitting the treated make-up water to the last and lowest pressure chamber to replenish the volume removed from the system by vaporization and said waste directing means and to form a mixture with the enriched solution in said last flash evaporation chamber, and means for withdrawing the mixture from said last chamber and directing said mixture to said heat recovering section of said heat exchanging means to complete a recirculation loop.

2. The system recited in claim 1, and further including means for collecting and condensing the vapor formed in the flash cooling vessel to form substantially pure water.

3. The system recited in claim 1, and further including a deaeration structure, means for admitting the chemically treated make-up water to said deaeration structure, means for maintaining said deaeration structure at a substantially sub-atmospheric pressure, thereby to deaerate the treated make-up of dissolved gases, means for directing at least a portion of the flashed vapor from the flash cooling vessel to said deaeration structure to augment deaeration of the treated make-up, and means for directing the thus deaerated make-up to the last and lowest pressure flash evaporation chamber.

4. The system recited in claim 1, wherein the conduit is effective to remove a portion of the enriched solution from the chamber immediately preceding said last and lowest pressure chamber.

5. The system recited in claim 1, wherein the conduit is effective to remove a portion of the enriched solution from the chamber immediately preceding said last and lowest pressure chamber, and further including means responsive to the level of the water mixture in the last chamber for regulating the rate of removal of the enriched solution from said immediately preceding chamber by the conduit.

6. The structure recited in claim 1 wherein the deaeration structure comprises a vessel disposed externally of the lowest pressure chamber.

7. The method of operating a recirculating multistage flash evaporation system having a heat rejecting zone, a heat recovering zone and a top heating zone for extracting substantially pure water from water containing impurities in solution, which method comprises:
(a) passing chemically treated impure water through the heat recovering zone and the top heating zone to heat the impure water to a predetermined temperature,
(b) directing the thus heated impure water through a series of flash evaporation chambers at successively lower pressures from a first and highest pressure to a last and lowest pressure to effect staged partial evaporation in each chamber, with an attendant increase in concentration of the water and formation of an enriched solution,
(c) removing a minor portion of the enriched solution from a chamber at a higher pressure than said last chamber but at a lower pressure than said first chamber,
(d) introducing water to the system as incoming impure water make-up,
(e) treating said incoming impure water make-up with a chemical additive to reduce the corrosion and/or scaling tendencies of the make-up water,
(f) adding the chemically treated impure make-up water to said last and lowest pressure chamber to replace the liquid removed from the system by vaporization and by removal of said minor portion of the enriched solution, and to form a mixture with the remaining portion of the enriched solution in said last chamber,
(g) directing said mixture as recited in step (a) through said heat recovering zone and said top heating zone to maintain recirculation,
(h) flash evaporating said minor portion of the enriched solution to yield additional vapor and cool said minor portion; and
directing the thus cooled minor portion of enriched solution to waste.

8. The method recited in claim 7, wherein
(a) the minor portion of enriched solution is removed from the chamber at the next to the lowest flash evaporation pressure, and
(b) the cooled minor portion is directed to waste at a rate determined by the level of the liquid in the last and lowest pressure chamber.

9. The method recited in claim 7, wherein
(a) at least a portion of the vapor from the minor portion of the enriched solution is employed to augment deaeration of the treated make-up water, after step (e) but before step (f).

References Cited

UNITED STATES PATENTS

| | | | |
|---|---|---|---|
| 2,759,882 | 8/1956 | Worthen et al. | 202—174 X |
| 2,908,618 | 10/1959 | Bethon | 202—174 |
| 3,105,020 | 9/1963 | Silver et al. | 203—11 X |
| 3,119,752 | 1/1964 | Checkovich | 202—173 |
| 3,152,053 | 10/1964 | Lynam | 202—173 |
| 3,218,241 | 11/1965 | Checkovich | 159—2 X |
| 3,300,392 | 1/1967 | Ross et al. | 203—11 X |
| 3,320,137 | 5/1967 | Jebins et al. | 203—11 X |
| 3,367,845 | 2/1968 | Coit et al. | |
| 3,399,118 | 8/1968 | Williamson | 202—173 |

NORMAN YUDKOFF, Primary Examiner

F. E. DRUMMOND, Assistant Examiner

U.S. Cl. X.R.

202—173; 203—11, 88